United States Patent
Xu et al.

(10) Patent No.: US 10,735,758 B2
(45) Date of Patent: Aug. 4, 2020

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US); Stephan Wenger, Hillsborough, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/138,919

(22) Filed: Sep. 21, 2018

(65) Prior Publication Data

US 2019/0182496 A1    Jun. 13, 2019

Related U.S. Application Data

(60) Provisional application No. 62/595,946, filed on Dec. 7, 2017.

(51) Int. Cl.
*H04N 19/44* (2014.01)
*H04N 19/139* (2014.01)
*H04N 19/176* (2014.01)
*H04N 19/119* (2014.01)
*H04N 19/105* (2014.01)

(52) U.S. Cl.
CPC .......... *H04N 19/44* (2014.11); *H04N 19/105* (2014.11); *H04N 19/119* (2014.11); *H04N 19/139* (2014.11); *H04N 19/176* (2014.11)

(58) Field of Classification Search
CPC .... H04N 19/44; H04N 19/105; H04N 19/119; H04N 19/139; H04N 19/176
USPC .................................................... 375/240.02
See application file for complete search history.

(56) References Cited

U.S. PATENT DOCUMENTS

| 8,526,495 | B2 | 9/2013 | Liu et al. |
| 9,049,452 | B2 | 6/2015 | Liu et al. |
| 9,510,012 | B2 | 11/2016 | Liu et al. |
| 9,813,726 | B2 | 11/2017 | Liu et al. |

(Continued)

OTHER PUBLICATIONS

Shan Liu, JongWon Kim and C.-C. Jay Kuo, "Mci-embedded motion-compensated prediction for quality enhancement of frame interpolation" in Multimedia Systems and Applications III, vol. 4209, p. 251-262, Mar. 2001.

(Continued)

*Primary Examiner* — Jared Walker
(74) *Attorney, Agent, or Firm* — Oblon, McClelland, Maier & Neustadt, L.L.P.

(57) ABSTRACT

Aspects of the disclosure provide methods and apparatuses for video decoding. In some embodiments, an apparatus for video decoding includes processing circuitry. The processing circuitry decodes prediction information for a block in a current coded picture that is a part of a coded video sequence. The prediction information is indicative of a merge submode. Then, the processing circuitry constructs, in response to the merge submode, a candidate list of candidate motion vector predictors for the block. The candidate list includes one or more first candidates that are corner neighbors of the block and at least one second candidate that is a side neighbor of the block. Then, the processing circuitry reconstructs the block according to motion information associated with the second candidate.

20 Claims, 13 Drawing Sheets

(56) References Cited

U.S. PATENT DOCUMENTS

| | | | | |
|---|---|---|---|---|
| 2013/0177083 A1* | 7/2013 | Chen | ...................... | H04N 19/70 |
| | | | | 375/240.16 |
| 2016/0381383 A1* | 12/2016 | Oh | ...................... | H04N 19/105 |
| | | | | 375/240.16 |
| 2017/0188044 A1* | 6/2017 | Takehara | ............. | H04N 19/105 |
| 2017/0238006 A1* | 8/2017 | Nakamura | ........... | H04N 19/105 |
| | | | | 375/240.16 |
| 2017/0332095 A1* | 11/2017 | Zou | ...................... | H04N 19/124 |
| 2017/0332099 A1* | 11/2017 | Lee | ...................... | H04N 19/122 |

OTHER PUBLICATIONS

High Efficiency Video Coding, Rec. ITU-T H.265 v4 Dec. 2016.
Xu, et al, "Non-CE2: Intra BC merge mode with default candidates", ISO/IEC JTC1/SC29/WG11 JCTVC-S0123, 2014.
Xu, et al, "CE2: Test 3.2—Intra Bc merge mode with default candidates", ISO/IEC JTC1/SC29/WG11 JCTVC-T0073, 2015.
Shan Liu, JongWon Kim and C.-C. Jay Kuo, "Nonlinear motion-compensated interpolation for low-bit-rate video" in Applications of Digital Image Processing XXIII, vol. 4115, p. 203-214, 2000.

\* cited by examiner

METHOD AND APPARATUS FOR VIDEO CODING

INCORPORATION BY REFERENCE

This present disclosure claims the benefit of priority to U.S. Provisional Application No. 62/595,946, "METHODS FOR MERGE LIST CONSTRUCTION" filed on Dec. 7, 2017, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from neighboring area's MVs. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be directed from metadata associated with one or more reference pictures, for example from the most recent (in decoding order) reference picture, using the MV associated with either one of five surrounding samples, denoted A0, A1, and B0, B1, B2 ((102) through (106), respectively). In H.265, the MV prediction can use predictors from the same reference picture that the neighboring block is using.

SUMMARY

Aspects of the disclosure provide methods and apparatuses for video decoding. In some embodiments, an apparatus for video decoding includes processing circuitry. The processing circuitry decodes prediction information for a block in a current coded picture that is a part of a coded video sequence. The prediction information is indicative of a merge submode. Then, the processing circuitry constructs, in response to the merge submode, a candidate list of candidate motion vector predictors for the block. The candidate list includes one or more first candidates that are corner neighbors of the block and at least one second candidate that is a side neighbor of the block. Then, the processing circuitry reconstructs the block according to motion information associated with the second candidate.

In an example, the at least one second candidate has a same row number or a same column number as a corner neighbor of the block. In another example, the at least one second candidate is a top side neighbor or a left side neighbor of the block.

In an embodiment, a number of the at least one second candidate is associated with a size of the block.

In some embodiments, the processing circuitry segments the block into block segments and inserts the at least one second candidate into the candidate list based on the block segments.

In an example, the processing circuitry determines whether a size of the block meets a segment requirement and segments the block into the block segments when the size meets the segment requirement.

In an embodiment, the processing circuitry inserts a first indicator indicative of a first neighboring sub-block into the candidate list. The first neighboring sub-block has a column relationship to a block segment in the block segments. In another embodiment, the processing circuitry inserts a second indicator indicative of a second neighboring sub-block into the candidate list. The second neighboring sub-block has a row relationship to the block segment.

To determine whether the size of the block meets the segment requirement, in an example, the processing circuitry determines whether a column length of the block is larger than a first length threshold. In another example, the processing circuitry determines whether a row length of the block is larger than a second length threshold. In another example, the processing circuitry determines whether an aspect ratio of the block is out of an aspect ratio range.

To segment the block into the block segments, in an example, the processing circuitry divides the block in half to generate intermediate block segments; and divides the intermediate block segments in half in a recursive manner when the intermediate block segments meet the segment requirement.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
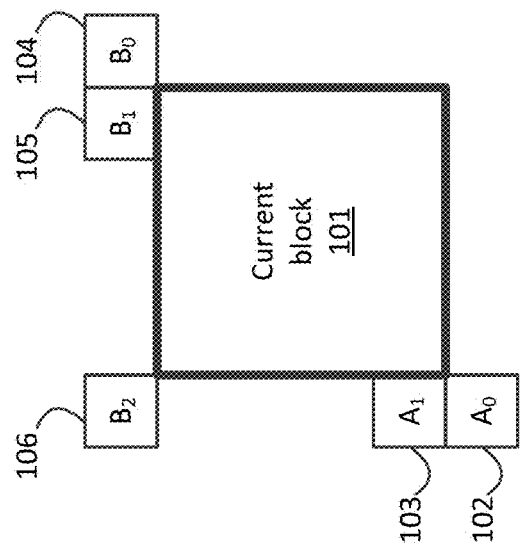
FIG. 1 is a schematic illustration of a current block and its surrounding spatial merge candidates in accordance with H.265.
Figure 2:
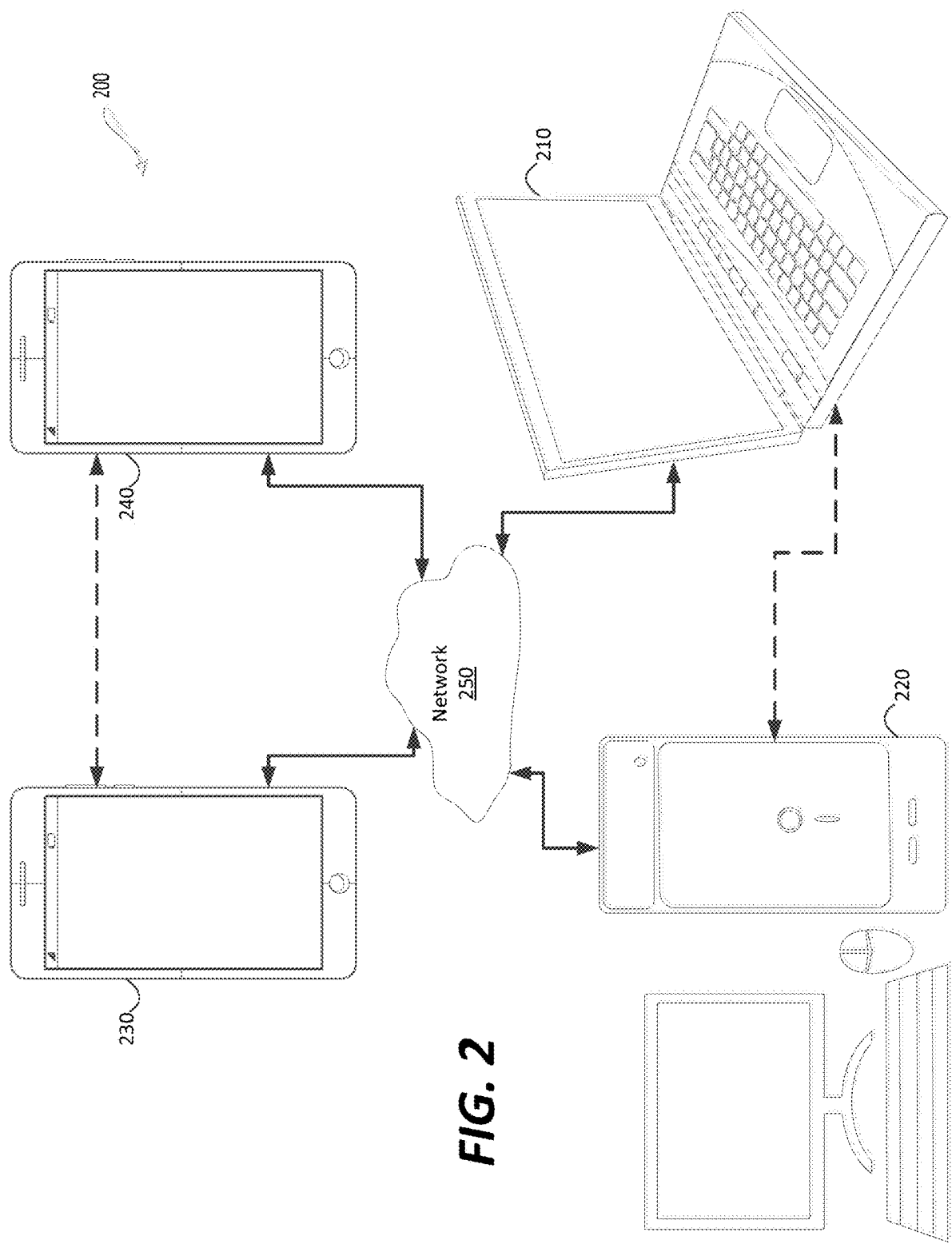
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
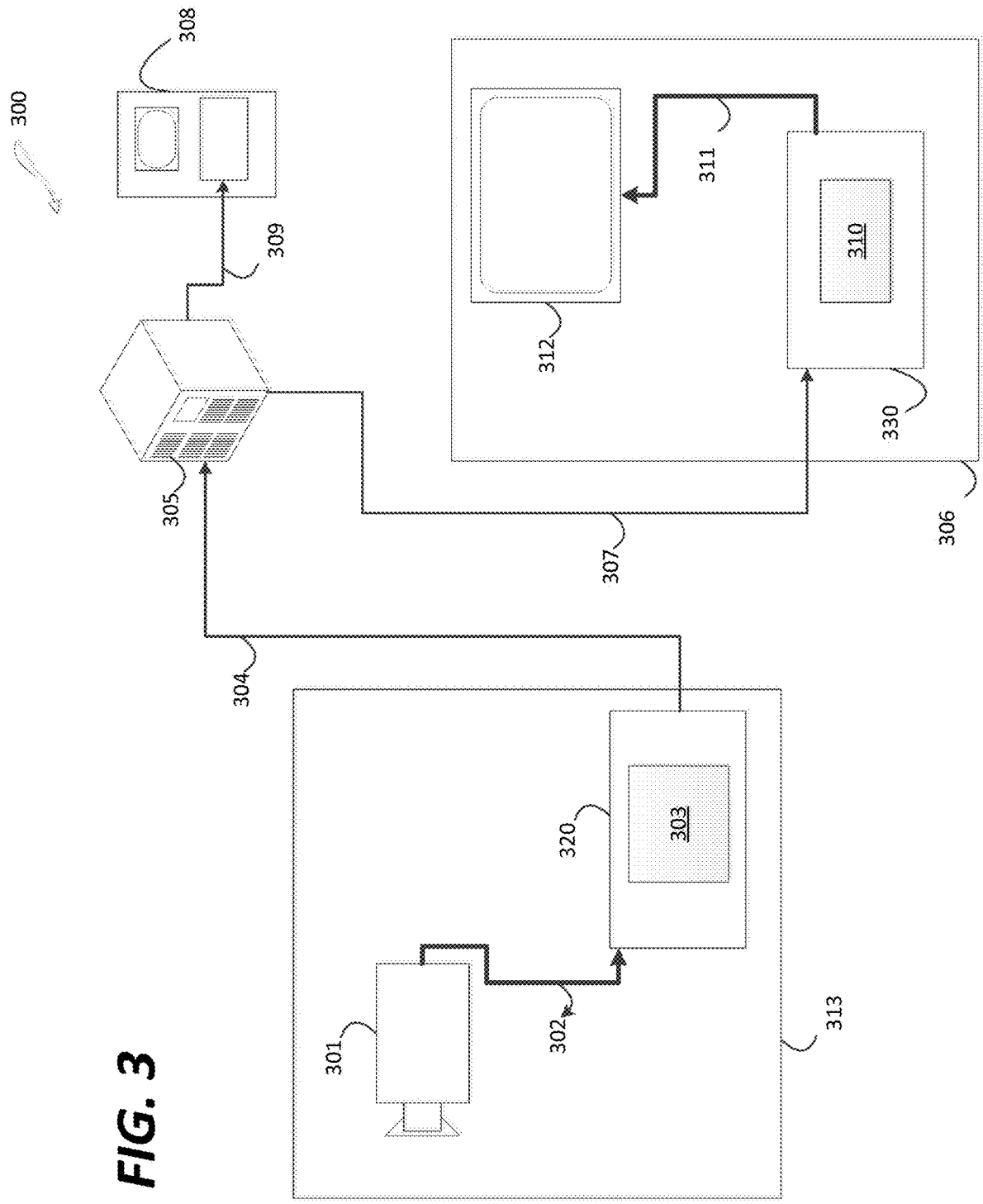
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
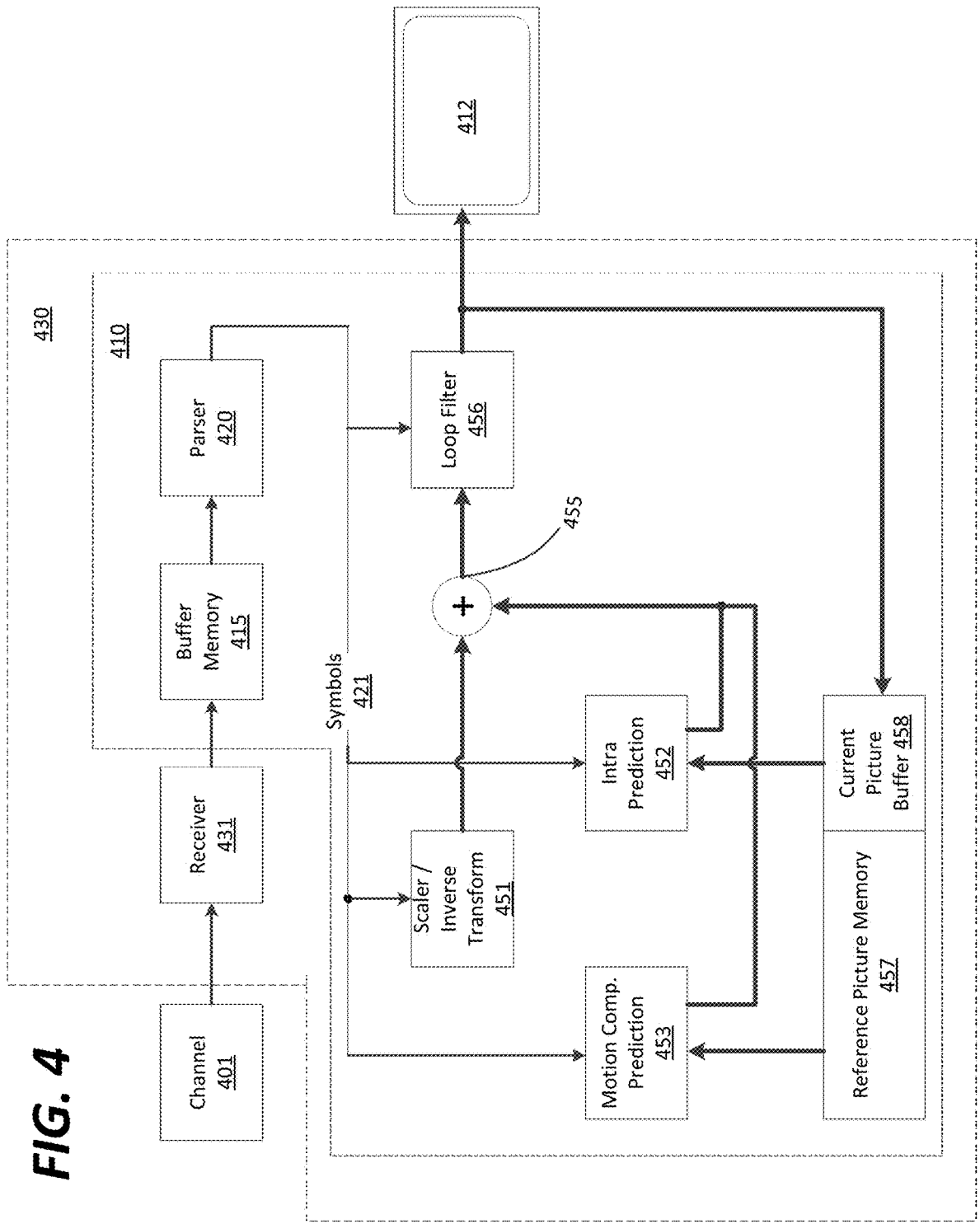
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. (4. The control information for the rendering device(s) may be in the form of Supplementary Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
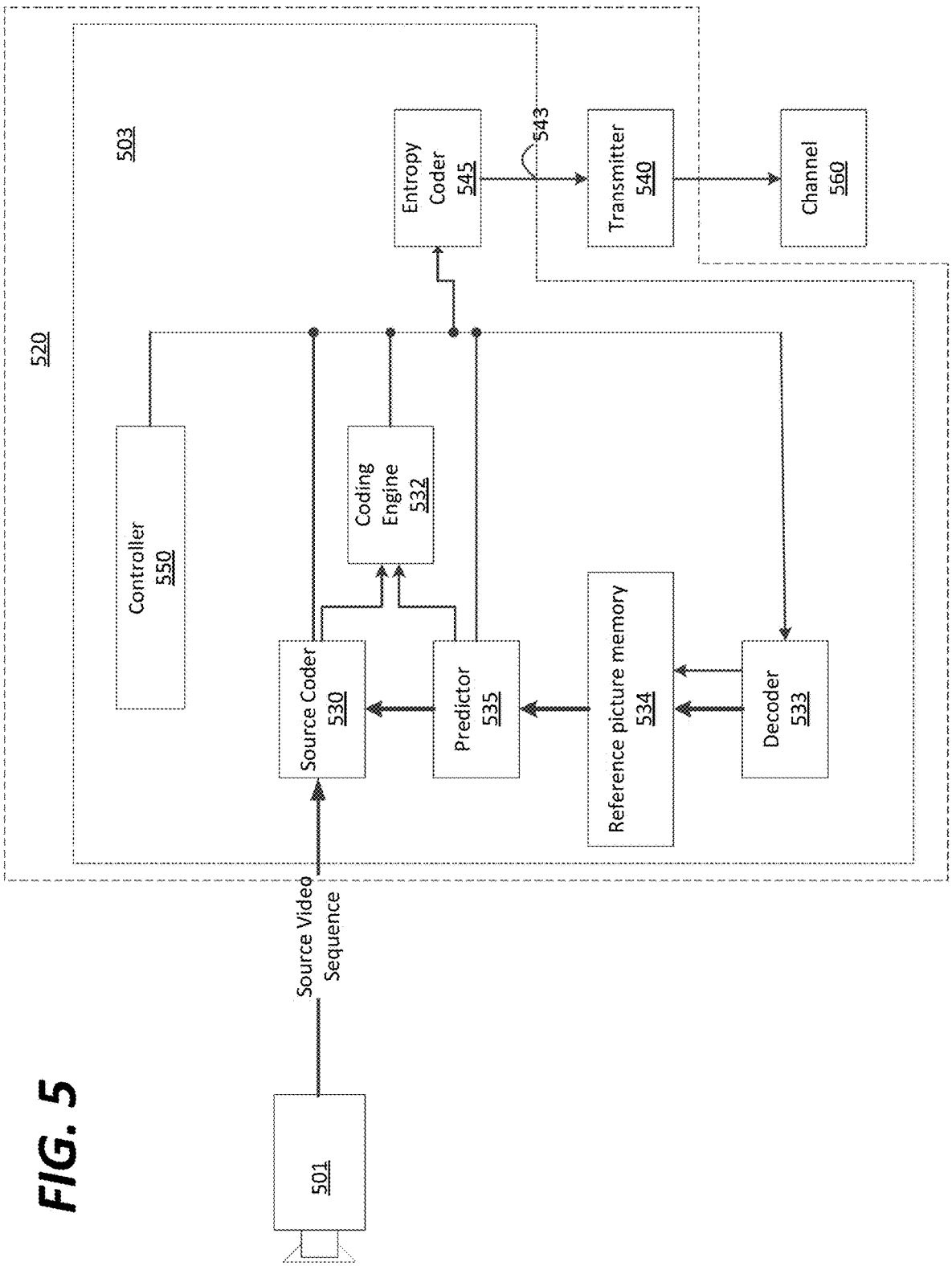
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501)(that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 6:
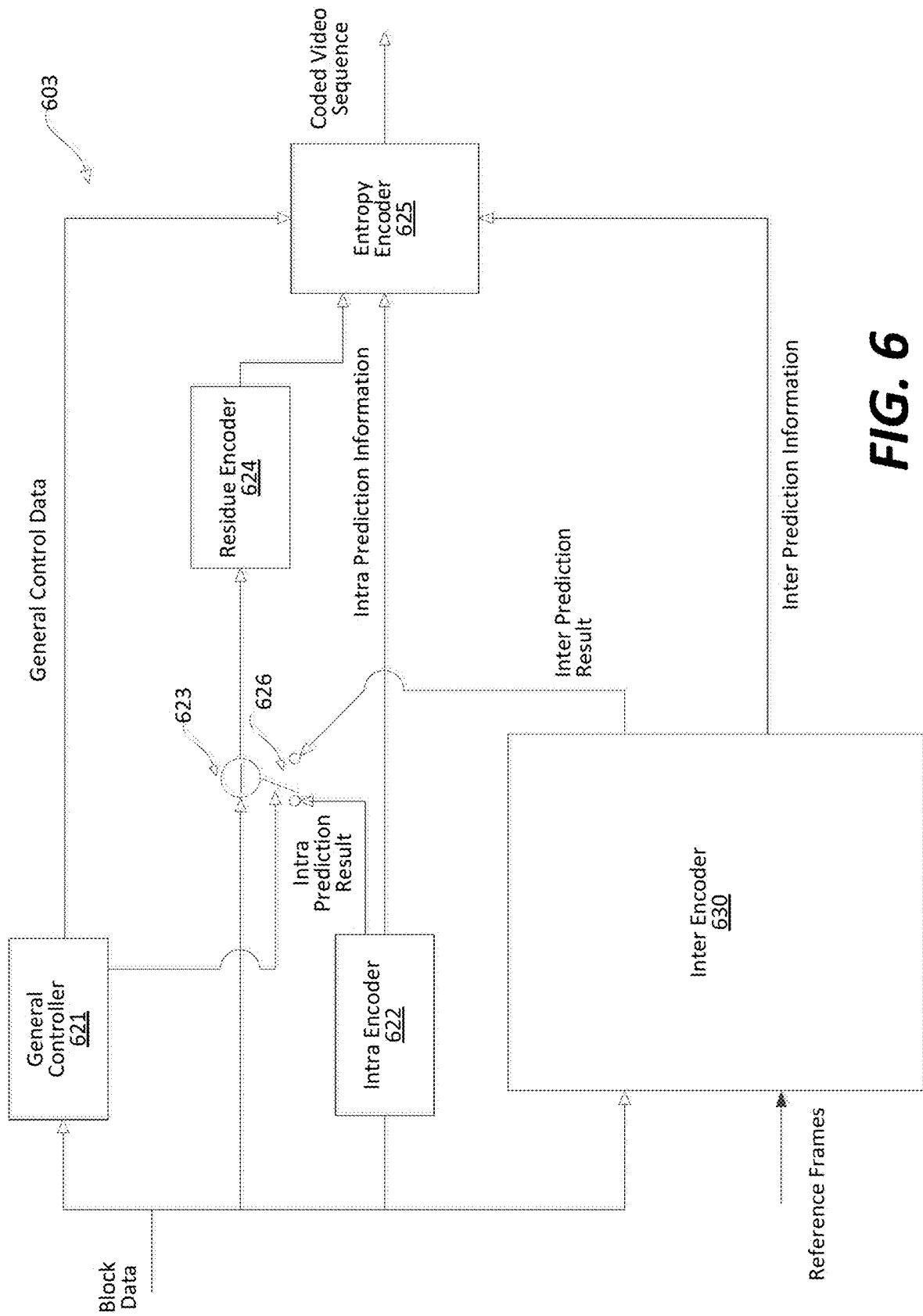
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621) and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (622) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (621) is configured to determine general control data and control other components of the video encoder (603) based on the general control data. In an example, the general controller (621) determines the mode of the block, and provides a control signal to the switch (626) based on the mode. For example, when the mode is the intra, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients.

The entropy encoder (625) is configured to format the bitstream to include the encoded block. The entropy encoder (625) is configured to include various information according to a suitable standard, such as HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
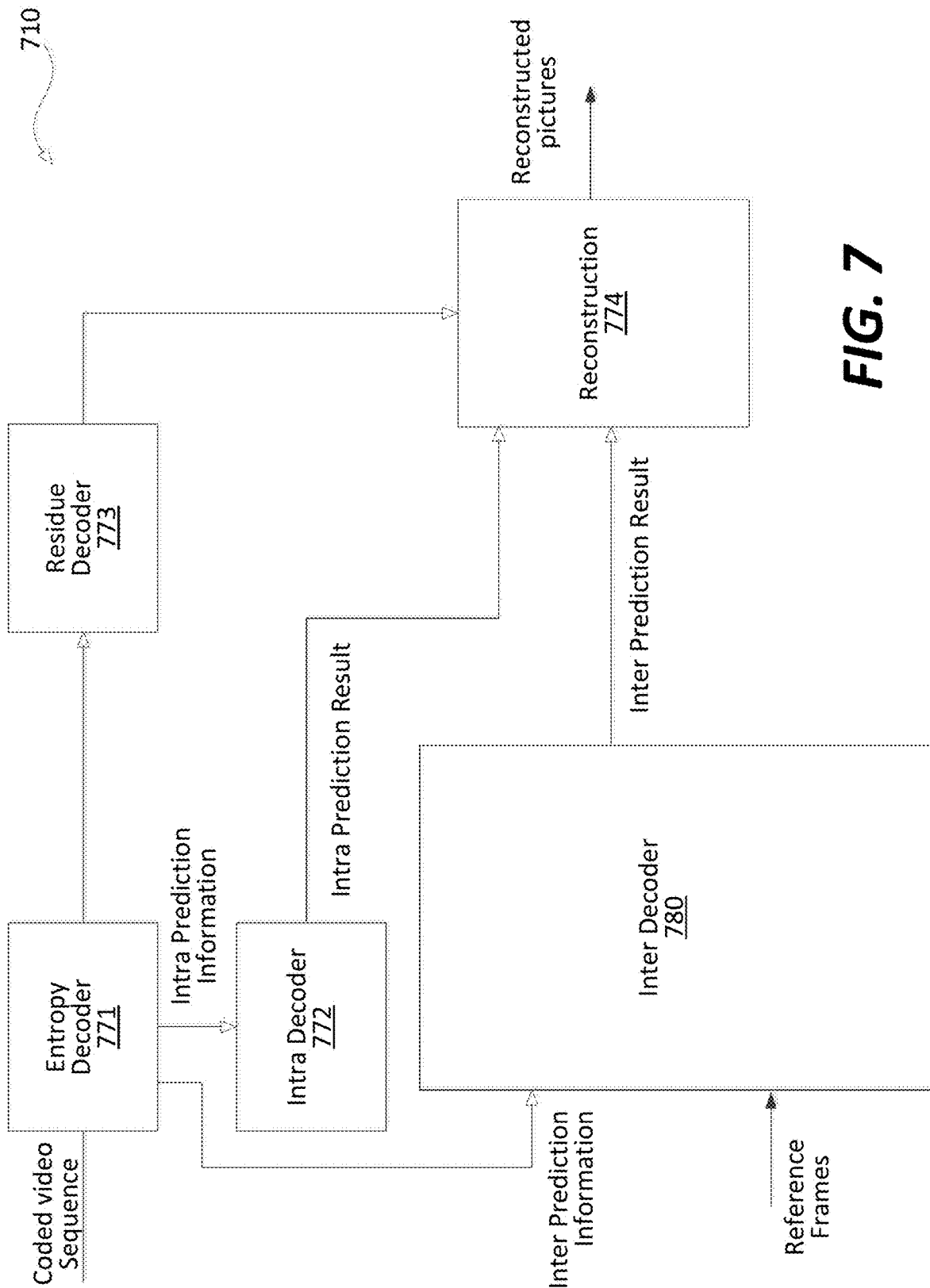
FIG. 7 shows a block diagram of a decoder in accordance with another embodiment.

FIG. 7 shows a diagram of a video decoder (710) according to another embodiment of the disclosure. The video decoder (710) is configured to receive a coded pictures that are part of a coded video sequence, and decode the coded picture to generate a reconstructed picture. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (772) or the inter decoder (780) respectively residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter QP), and that information may be provided by the entropy decoder (771) (datapath not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503) and (603), and the video decoders (310), (410) and (710) can be implemented using any suitable technique. In an embodiment, the video encoders (303), (503) and (603), and the video decoders (310), (410) and (710) can be implemented using one or more integrated circuits. In another embodiment, the video encoders (303), (503) and (503), and the video decoders (310), (410) and (710) can be implemented using one or more processors that execute software instructions.

Figure 8:
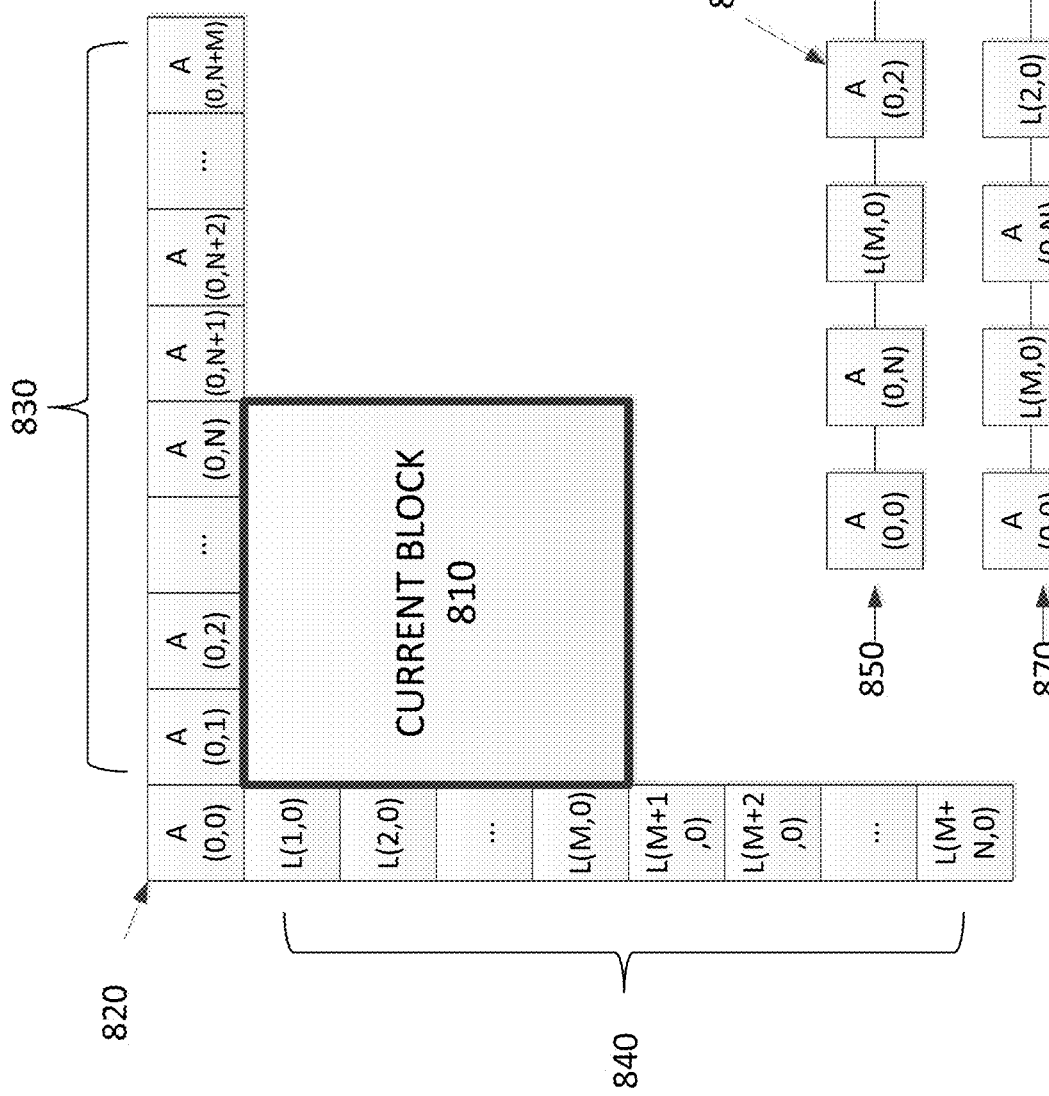
FIG. 8 is an exemplary schematic illustration of a motion vector prediction of a block and sub-blocks used for, or affected by, motion vector prediction.

Referring to FIG. 8, according to an aspect of the disclosure, merge mode can be a submode of inter or bi-prediction mode where the residual signal is not present in the bitstream, and assumed to be zero for all coefficients including the DC coefficient. When a current block is under decoding using merge mode, the displacements of pixels in the current block may be derived from already decoded spatial/temporal neighboring blocks' motion information.

In an embodiment, a block under merge mode may include an array of smaller motion vector units. Each motion vector unit is referred to as a sub-block, which can be a K×L number of samples, where K and L are positive integer numbers. For example, when K and L are four (K=L=4), a sub-block includes 4×4 samples, and is referred to as a 4×4 sub-block. Each 4×4 sub-block in the current block may have a different motion vector (or motion vector pair when bi-prediction is used). In another example, when K and L are one (K=L=1), a sub-bock includes 1×1 samples, and is referred to as 1×1 sub-block. Thus, each sample in the current block may have a different motion vector (or motion vector pair if bi-prediction is used).

In some embodiments, when sub-block level motion compensation is used, a candidate list (850) for the merge mode is constructed to include additional neighboring sub-block information (e.g., candidate (861), candidate (862) and candidate (863)) that is added based on the sub-blocks in the current block. In an example, when constructing the candidate list for merge mode, spatial neighboring reference blocks' motion information is to be selected. In addition to the outer candidates on top of the current block at left and right corners (e.g., A(0, 0) and A(0, N+1) in FIG. 8) as in HEVC, certain additional motion information from top candidate positions may be selected into the candidate list based on the sub-blocks (e.g., spatial characteristics of sub-blocks) when certain conditions are met. For example, candidate list (850) includes additional candidates A(0, 2) (861) and A(0, N+M) (863). Similarly, in addition to the outer candidates to the left of current block at top and bottom corners (e.g., A(0, 0) and L(M+1, 0) as in HEVC, certain additional motion information from left candidate positions are selected into the candidate list based on the sub-blocks (e.g., spatial characteristics of the sub-blocks) when certain conditions are met. For example, candidate list (850) includes candidate (862). In the following paragraphs, are a few aspects are disclosed to select such additional candidates for merge mode.

FIG. 8 shows a diagram of a current block (810) and surrounding neighboring sub-blocks (820), (830) and (840) that can be used as additional spatial candidates for the candidate list in the merge mode. In the FIG. 8 example, surrounding neighboring sub-blocks (820), (830), and (840) are 1×1 sub-blocks. The surrounding neighboring sub-block (820) (A(0, 0)) is a top-left sub-block of the current block (810). The surrounding neighboring sub-blocks 830 (A(0, 1)-A(0, N+M), N and M are positive integers) are the above sub-blocks (referred to as top sub-blocks in some examples) of current block (810). As an example, sub block A (0, 2) can be inserted as a candidate in the candidate list, for example in position (861) The surrounding neighboring sub-blocks (840) (L(1, 0)-L(M+N, 0)) are the left sub-blocks of current block (810).

The order of candidates in the candidate list may have a direct influence on the coding efficiency of the video coding technology, as candidates towards the front of the candidate list may be represented by shorter codewords than candidates towards the end. In some embodiments, along the left side (or top side) of the current block (810), more of the surrounding neighboring sub-blocks (830) and (840) in the reference area may be selected as candidates and may be inserted in the candidate list, for example in positions (861) (862) and (863) only when the size (e.g., the length) left side (or top side) of the current block (810) is of a sufficient, predetermined length. The number of potential candidate positions in the reference area to be selected on one side of the block may be determined by the block size (e.g., length) of this side. As an example, a comparatively long length side may potentially have more surrounding neighboring sub-blocks from this side selected as candidates than a comparatively short side. Doing so can limit the maximum length of the candidate list, which can have advantages from a computational complexity and memory consumption viewpoint.

In one embodiment, a length threshold T is defined such that when the block length W is greater than T along the current block (810)'s top (or left) side, the block will be virtually divided into, for example, two smaller block segments along the top (or left) side, with equal size. It is noted that, in the context of the disclosed subject matter, the block segments are used to determine additional candidates to be inserted in the candidate list for the merge mode, and may not used as encoding, decoding or prediction units, and thus are referred to as virtual block segments in some examples.

In the same or another embodiment, for each divided block segment, if the block length is still greater than the given threshold T, then a similar division operation can continue to divide each block segment into even smaller block segments by a predetermined factor, for example by halves, until in each block segment the length is no longer greater than T. The length threshold can be any integer number. In particular, the length threshold can advantageously be set as a power of 2. In some examples, a first length threshold is defined for the top side and a second length threshold is defined for the left side.

In a specific example, when the first length threshold T is defined to be 32 (e.g., in the units of pixels), and the block length of the top side (width W) of current block (810) is 128 (e.g., in the units of pixels). The block will be divided into left and right halves of equal size, each of the block segments will have a top length of 64 (e.g., in the units of pixels). In this example, 1 level of horizontal splitting, the block with length of 128 on top is divided into 2 (virtual) block segments, each with 64 (e.g., in the units of pixels) in length on top. Optionally, each of these two block segments will be further divided by left and right halves of equal size, having its block length on top as 32. In this example, up to 2 levels of horizontal splitting is performed such that the block with length of 128 on top is divided into 4 virtual block segments, each with 32 in length on top.

Further, according to an aspect of the disclosure, the surrounding neighboring sub-blocks (830) and (840) are selectively added in the candidate list according to spatial relationship with the block segments. In some examples, for each divided block segment, a top/left spatial candidate of its own should be added into the candidate list for the whole block.

Figure 9:
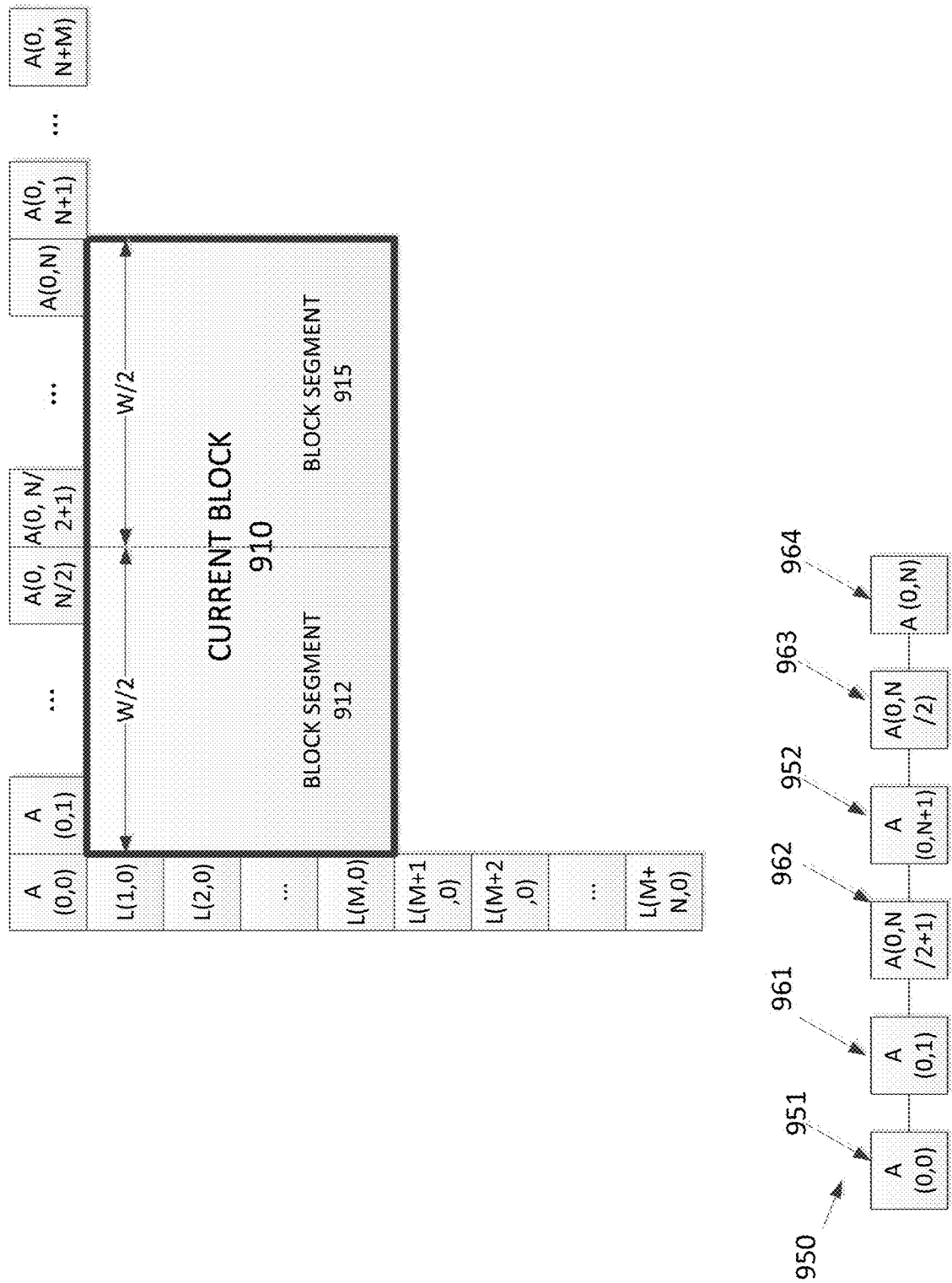
FIG. 9 is an exemplary schematic illustration of vertical motion vector prediction with uniform and square sub-block dimensions.

FIG. 9 shows an example that selectively inserts surrounding neighboring sub-blocks in the candidate list (950) based on the spatial relationship to the block segments, for example into candidate list position (961), (962), (963) and (964). In the FIG. 9 example, assume that the width (block length) W of a current block (910) is twice of the length threshold T. In this example, the current block (910) will be divided into two horizontal block segments (912) and (915), each with length W/2=T. In an example, the surrounding neighboring sub-blocks A(0, 0) and A(0, N+1) are candidates for the whole current block (910) and are added into the candidate list (950) (e.g., indicators that are indicative of the surrounding neighboring sub-blocks A(0, 0) (951) and A(0, N+1) (952) are added into the candidate list 950). In addition to the candidates of A(0, 0) and A(0, N+1), other candidates may be added into the candidate list. In an example, A(0, 1) and A(0, N/2+1) are considered as the top left and right neighbors of the left half block segment (912), and may be inserted into the candidate list (e.g., indicators that are indicative of the surrounding neighboring sub-blocks A(0, 1) and A(0, N/2+1) are added into the candidate list 950 for example at positions (962) and (963)). In another example, A(0, N/2) and A(0, N) are considered as the top left and right neighbors of the divided right half block segment (915), and are inserted into the candidate list (950) (e.g., indicators that are indicative of the surrounding neighboring sub-blocks A(0, N/2) and A(0, N) are added into the candidate list (950) for examples at positions (963) and (964)).

Figure 10:
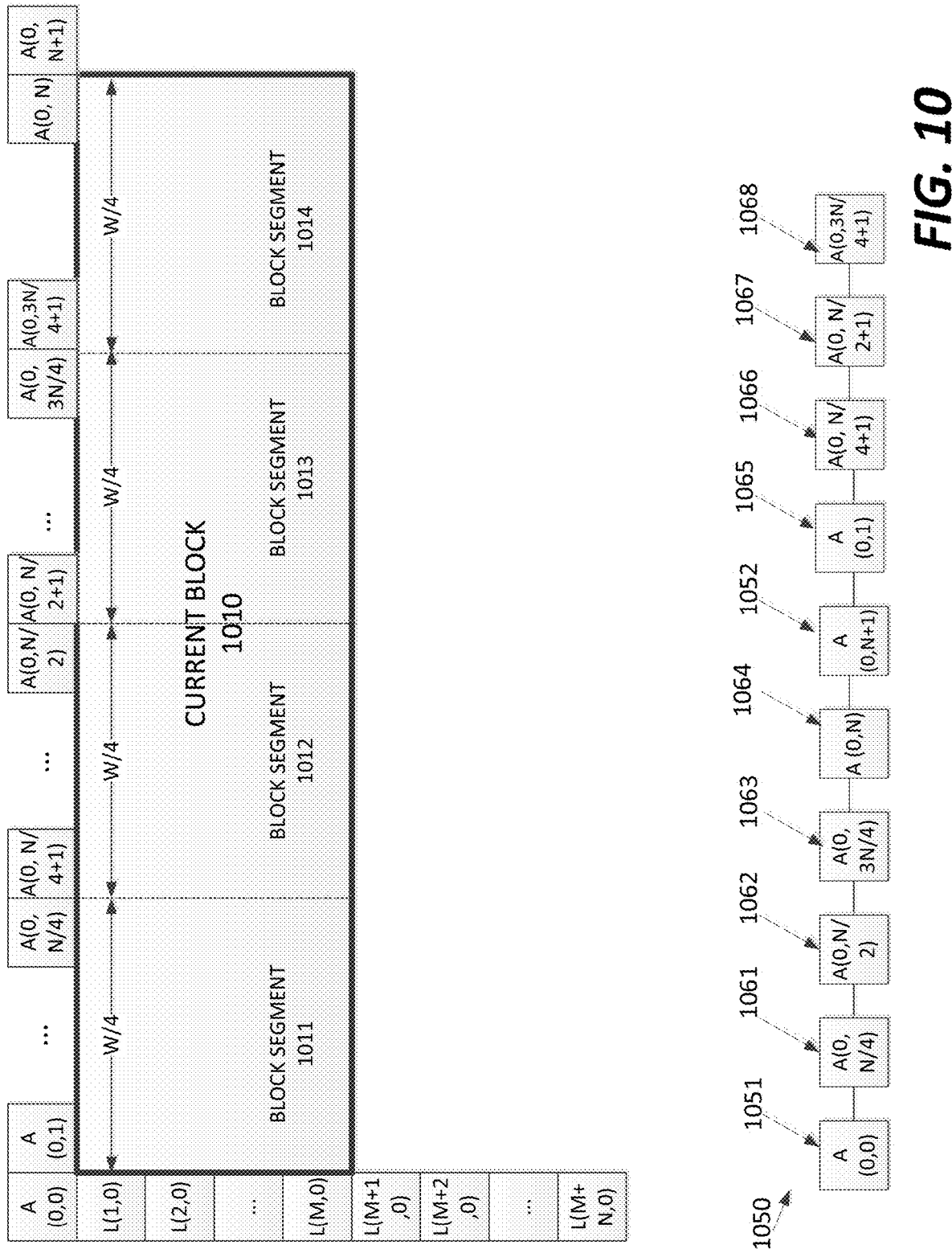
FIG. 10 is an exemplary schematic illustration of vertical motion vector prediction with rectangular and non-uniform sub-block sizes.

FIG. 10 shows another example that selectively inserts surrounding neighboring sub-blocks in the candidate list (1050) based on the spatial relationship to the block segments. In the FIG. 10 example, assume that the width (block length) W of a current block (1010) is four times of the length threshold T. Still assuming a subdivision by a power of 2, the current block (1010) will be divided into four horizontal block segments (1011)-(1014), each with length W/4=T. In an example, the surrounding neighboring sub-blocks A(0, 0) and A(0, N+1) are candidates for the whole current block (1010) and are added into the candidate list (1050) (e.g., indicators that are indicative of the surrounding neighboring sub-blocks A(0, 0) and A(0, N+1) are added into the candidate list (1050) at positions (1051) and (1052)). In addition to the candidates of A(0, 0) and A(0, N+1), other candidates are added into the candidate list (1050). In an example, A(0, N/4), A(0, N/2), A(0, 3N/4) and A(0, N) are inserted into the candidate list (1050) at positions (1061), (1062), (1063) and (1064). In another example, A(0, 1), A(0, N/4+1), A(0, N/2+1), A(0, 3N/4+1) are inserted into the candidate list (1050) at positions (1065), (1066), (1067) and (1068). The above is just a discussion of top reference candidates, as an example, similar methods apply to the block height of the current block if the block height is taller than a given threshold.

It is noted that in an example, when the length of the top/left side is shorter than T, no additional candidate will be selected.

In some embodiments, the division of a block into block segments can be triggered by an aspect ratio of the block. For example, when the aspect ratio is out of an aspect ratio range (e.g., higher than an upper boundary of the aspect ratio range or lower than a lower boundary of the aspect ratio range), the longer side of the block is divided for example into halves. In one embodiment, the aspect ratio range is from ½ to 2. In another embodiment, the aspect ratio range is ¼ to 4.

Aspects of the disclosure also provide candidate ordering techniques for constructing the candidate list. In some embodiments, the construction of a candidate list in a merge mode may start from putting the current block's top and then left neighboring reference blocks into the candidate list. According to an aspect of the disclosure, non-square shape blocks have different priorities of merging into their top or left neighbors. In some examples, the candidate list is constructed according to the shape of current block.

In some embodiments, when the block width is longer than or equal to the block height, then the candidate list construction may put the current block's important (i.e., statistically more likely to be selected, because of the geometry) top neighbors before its left neighbors. Otherwise, when the block width is shorter than the block height, then the candidate list construction may put the current block's important left neighbors before its top neighbors.

Specifically, in an example, a current block has a rectangle shape of width by height. Using FIG. 8 as example, in one embodiment, when width>=height (e.g., N>M), a candidate entry A(0, N) is put before L(M, 0) such as shown in the candidate list (850). Otherwise, when width<height (e.g., N<M), a candidate entry L(M, 0) is put before A(0, N) such as shown in the candidate list (870).

In another embodiment, when width>=height, and when the additional merge candidates from the top neighbors exist (from virtual block segments as described above), these additional top candidates may be put in front of the additional left candidates (if they exist), such as shown in the candidate list (850). Otherwise, when width<height, and when the additional merge candidates from the left neighbors exist (from virtual block segments as described above), these additional left candidates may be put in front of the additional top candidates (if they exist), such as shown in the candidate list (870).

In another embodiment, when the block width is longer than or equal to the block height, then the candidate list construction may put current the block's important (frequently selected) left neighbors before its top neighbors. Otherwise, when the block width is shorter than the block height, then the candidate list construction may put the current block's important (frequently selected) top neighbors before its left neighbors.

Specifically, in an example, a current block has a rectangle shape of width by height. In one embodiment, when width>=height, a candidate entry L(M, 0) is put before A(0, N), such as shown in the candidate list (870). Otherwise, when width<height, a candidate entry A(0, N) is put before L(M, 0), such as shown in the candidate list (850).

In another embodiment, when width>=height, and when the additional merge candidates from the left neighbors exist (from virtual block segments as described above), these additional left candidates may be put in front of the additional top candidates (if they exist), such as shown in the candidate list (870). Otherwise, when width<height, and when the additional merge candidates from the top neighbors exist (from virtual block segments as described above), these additional top candidates may be put in front of the additional left candidates (if they exist), such as shown in the candidate list (850).

Figure 11:
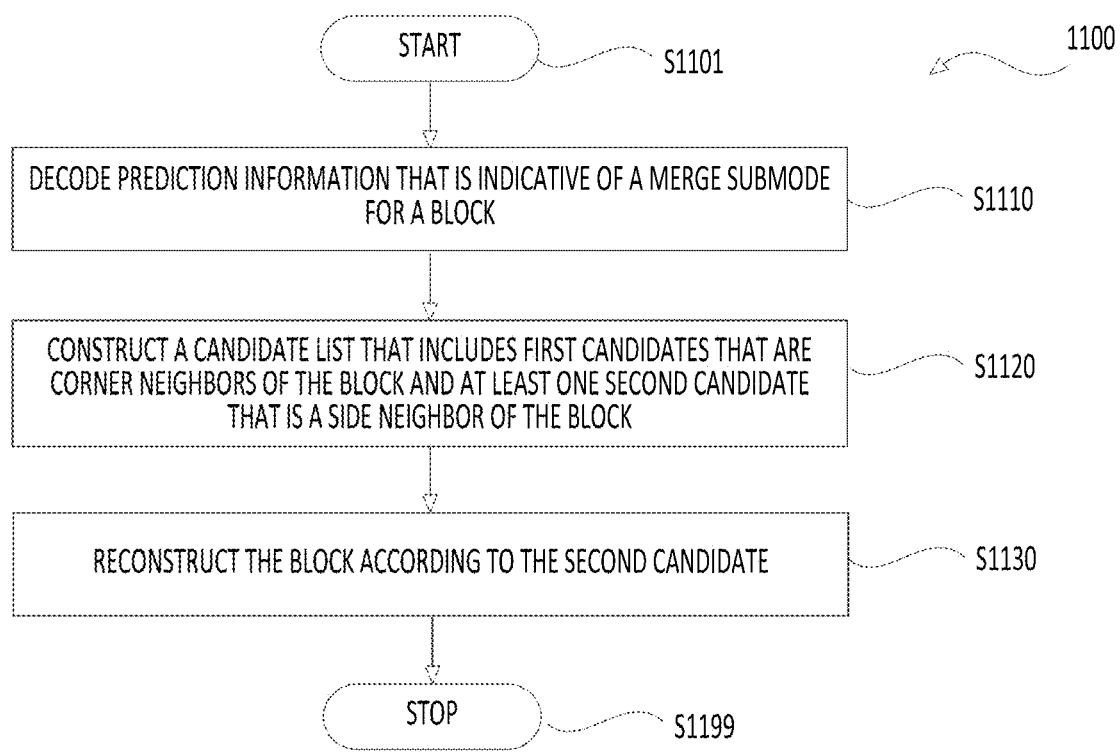
FIG. 11 shows a flow chart outlining a process (1100) according to some embodiments of the disclosure.

FIG. 11 shows a flow chart outlining a process (1100) according to some embodiments of the disclosure. The process (1100) can be used in the reconstruction of a block coded in inter mode and merge submode, so to generate a prediction block for the block under reconstruction. During the process (1100), a candidate list may be generated with candidates that are added based on certain characteristics of the block, including, for example, size characteristics. In various embodiments, the process (1100) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the motion compensation prediction module (453), the processing circuitry that performs functions of the video encoder (503), the processing circuitry that performs functions of the predictor (535), the processing circuitry that performs functions of the inter encoder (630), the processing circuitry that performs functions of the inter decoder (780), and the like. In some embodiments, the process (1100) is implemented in software instructions, thus when the processing circuitry executes the software instructions, the processing circuitry performs the process (1100). The process starts at (S1101) and proceeds to (S1110).

At (S1110), prediction information for a block is decoded. In an example, the processing circuitry decodes the prediction information, and determines that the prediction information is indicative of a merge submode that is a submode of inter or bi-prediction mode.

At (S1120), in response to the merge submode, the processing circuitry constructs a candidate list that includes first candidates that are corner neighbors of the block and at least one second candidate that is a side neighbor of the block. In some examples, a corner neighbor is a neighbor to the corners of the block, such as A(0, 0), L(M+1, 0), A(0, N+1), L(M, 0) and A(0, N) in the FIG. 8 example, and a side neighbor is a neighbor to the top side or left side of the block, such as A(0, 1)-A(1, N−1), A(0, N+2)-A(0, N+M), L(1, 0)-L(M−1, 0), L(M+2, 0)-L(M+N) in the FIG. 8 example.

At (S1130), the block is reconstructed according to the at least one second candidate. In an example, the block is reconstructed based on the candidate list that includes the at least one second candidate. Then the process proceeds to (S1199) and terminates.

Figure 12:
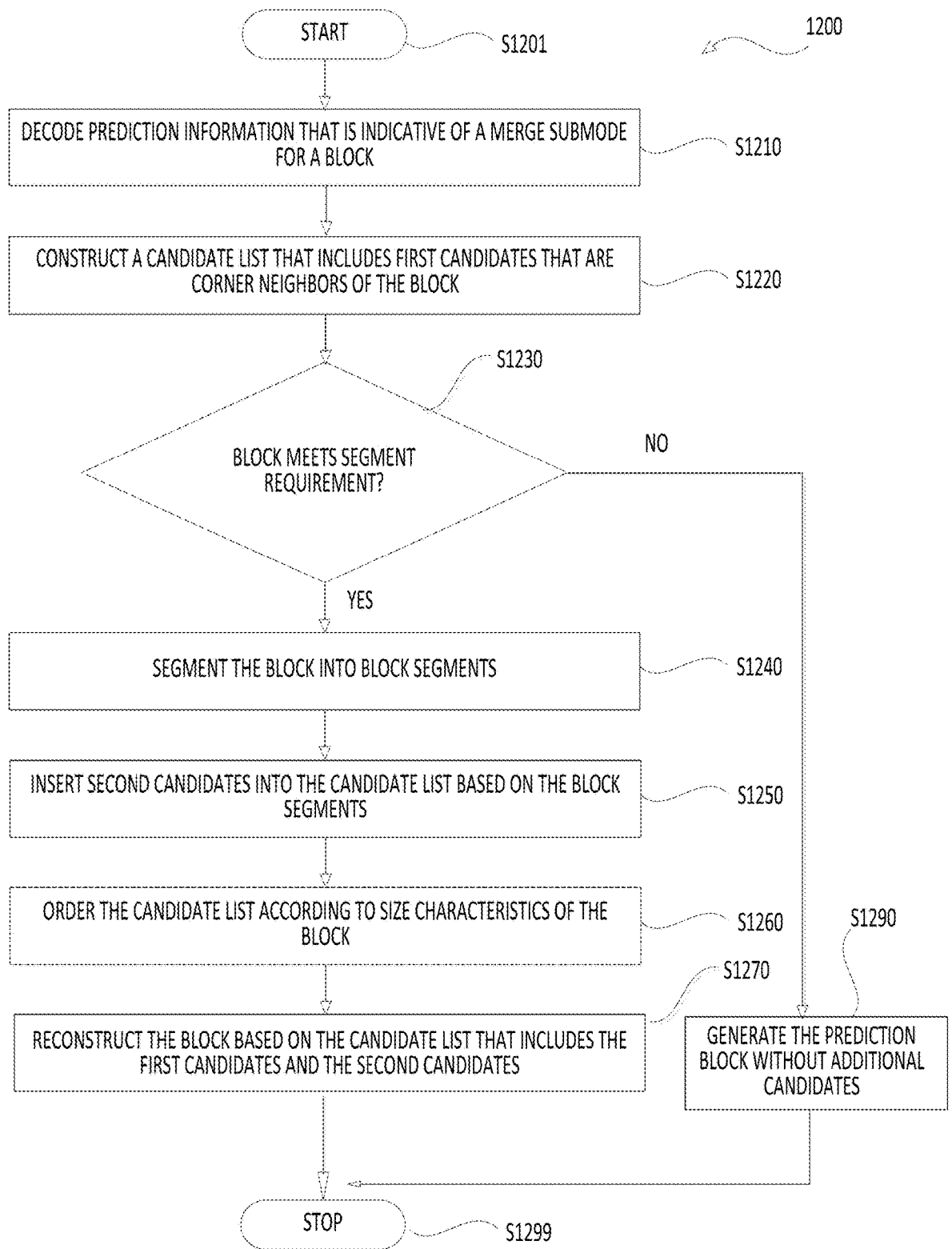
FIG. 12 shows a flow chart outlining a process (1200) according to some embodiments of the disclosure.

FIG. 12 shows a flow chart outlining a process (1200) according to some embodiments of the disclosure. The process (1200) can be used in the reconstruction of a block coded in inter mode and merge submode, so to generate a prediction block for the block under reconstruction. During the process (1200), a candidate list may be generated with candidates that are added based on certain characteristics of the block, including, for example, size characteristics. In various embodiments, the process (1200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the motion compensation prediction module (453), the processing circuitry that performs functions of the video encoder (503), the processing circuitry that performs functions of the predictor (535), the processing circuitry that performs functions of the inter encoder (630), the processing circuitry that performs functions of the inter decoder (780), and the like. In some embodiments, the process (1200) is implemented in software instructions, thus when the processing circuitry executes the software instructions, the processing circuitry performs the process (1200). The process starts at (S1201) and proceeds to (S1210).

At (S1210), prediction information for a block is decoded. For example, the processing circuitry decodes the prediction information, and determines that the prediction information is indicative of a merge submode that is a submode of inter or bi-prediction mode.

At (S1220), a candidate list is constructed that includes first candidates that are corner neighbors of the block. In an example, the processing circuitry constructs a candidate list that initially includes first candidates that are corner neighbors of the block. In some examples, a corner neighbor is a neighbor to the corners of the block, such as A(0, 0), L(M+1, 0), A(0, N+1), L(M, 0) and A(0, N) in the FIG. 8 example. In the following steps, the processing circuitry will insert one or more second candidates that are the side neighbors based on size characteristics of the block. In some examples, a side neighbor is a neighbor to the top side or left side of the block, such as A(0, 1)-A(1, N−1), A(0, N+2)-A(0, N+M), L(1, 0)-L(M−1, 0), L(M+2, 0)-L(M+N) in the FIG. 8 example.

At (S1230), the processing circuitry determines whether the block meets a segment requirement. In an example, the processing circuitry determines whether a width (e.g., the number of columns of pixels in the block) or a height (e.g., the number of rows of pixels in the block) is larger than a threshold. When the block meets the segment requirement, the process proceeds to (S1240); otherwise, the process proceeds to (S1290).

At (S1240), the block is divided into block segments that no longer meet the segment requirement. In an example, the block is repetitively divided in half until the segment requirement is no longer met.

At (S1250), additional one or more candidates are inserted into the candidate list based on the block segments, such as described with reference to FIG. 9 and FIG. 10.

At (S1260), in some embodiments, the candidates in the candidate list can be ordered according to size characteristics of the block.

At (S1270), the block is reconstructed according to the candidate list that includes the first candidates and the second candidates. Then the process proceeds to (S1299).

At (S1290), the processing circuitry generates the prediction block according to the candidate list without adding the second candidates in the candidate list. Then the process proceeds to (S1299) and terminates.

It is noted that the process (1200) can be suitably modified. In an example, the step (S1260) can be skipped.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
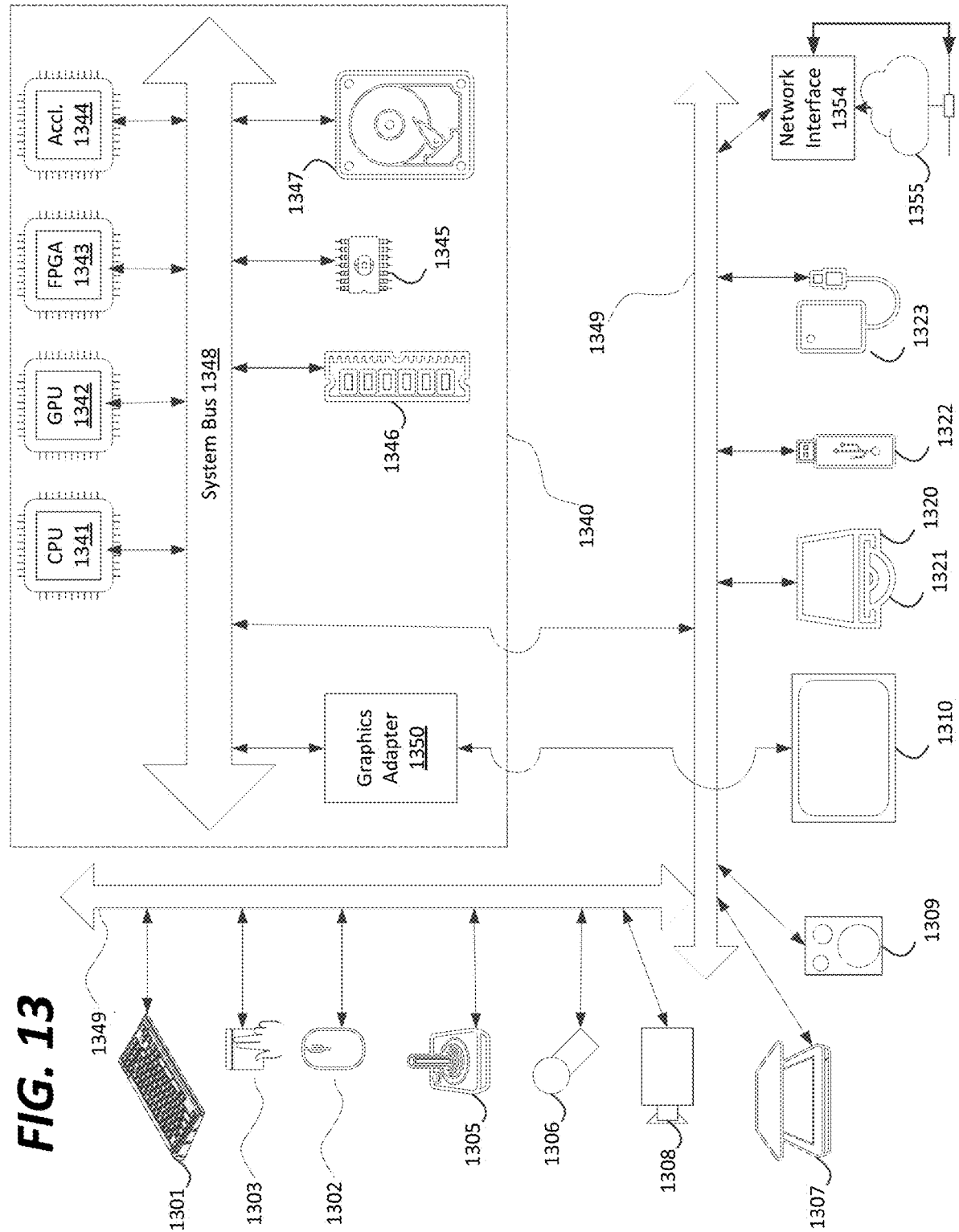
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

MV: Motion Vector
HEVC: High Efficiency Video Coding
SEI: Supplementary Enhancement Information
VUI: Video Usability Information GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding prediction information for a block in a current coded picture that is a part of a coded video sequence, the prediction information being indicative of a merge submode;
   constructing, in response to the merge submode, a candidate list of candidate motion vector predictors for the block, the candidate list including one or more first candidates from a first set of candidates that includes corner neighbors of the block and, when a size of the block meets a segment requirement, at least one second candidate from a second set of candidates that includes a side neighbor of the block, the first set of candidates not including the second set of candidates; and
   reconstructing the block according to motion information associated with one of the at least one second candidate.

2. The method of claim 1, wherein the at least one second candidate has a same row number or a same column number as a corner neighbor of the block.

3. The method of claim 1, wherein the at least one second candidate is a top side neighbor or a left side neighbor of the block.

4. The method of claim 1, wherein a number of the at least one second candidate is associated with the size of the block.

5. The method of claim 1, further comprising:
   segmenting the block into block segments; and
   inserting the at least one second candidate into the candidate list based on the block segments.

6. The method of claim 5, wherein the segmenting the block into the block segments further comprises:
   determining whether the size of the block meets the segment requirement; and
   segmenting the block into the block segments when the size meets the segment requirement.

7. The method of claim 5, further comprising at least one of:
   inserting a first indicator indicative of a first neighboring sub-block into the candidate list, the first neighboring sub-block having a column relationship to a block segment in the block segments; and
   inserting a second indicator indicative of a second neighboring sub-block into the candidate list, the second neighboring sub-block having a row relationship to the block segment.

8. The method of claim 6, wherein the determining whether the size meets the segment requirement further comprises at least one of:
   determining whether a column length of the block is larger than a first length threshold;
   determining whether a row length of the block is larger than a second length threshold; and
   determining whether an aspect ratio of the block is out of an aspect ratio range.

9. The method of claim 6, wherein the segmenting the block when the size meets the segment requirement further comprises:
   dividing the block in half to generate intermediate block segments; and
   dividing the intermediate block segments in half in a recursive manner when the intermediate block segments meet the segment requirement.

10. The method of claim 1, further comprising:
    ordering the one or more first candidates and the at least one second candidate in the candidate list based on a size characteristic of the block.

11. An apparatus, comprising:
    processing circuitry configured to:
        decode prediction information for a block in a current coded picture that is a part of a coded video sequence, the prediction information being indicative of a merge submode;
        construct, in response to the merge submode, a candidate list of candidate motion vector predictors for the block, the candidate list including one or more first candidates from a first set of candidates that includes corner neighbors of the block and, when a size of the block meets a segment requirement, at least one second candidate from a second set of candidates that includes a side neighbor of the block, the first set of candidates not including the second set of candidates; and
        reconstruct the block according to motion information associated with one of the at least one second candidate.

12. The apparatus of claim 11, wherein the at least one second candidate has a same row number or a same column number as a corner neighbor of the block.

13. The apparatus of claim 11, wherein the at least one second candidate is a top side neighbor or a left side neighbor of the block.

14. The apparatus of claim 11, wherein a number of the at least one second candidate is associated with the size of the block.

15. The apparatus of claim 11, wherein the processing circuitry is further configured to:

segment the block into block segments; and insert the at least one second candidate into the candidate list based on the block segments.

16. The apparatus of claim 15, wherein the processing circuitry is further configured to:

determine whether the size of the block meets the segment requirement; and segment the block into the block segments when the size meets the segment requirement.

17. The apparatus of claim 15, wherein the processing circuitry is configured to insert a first indicator indicative of a first neighboring sub-block into the candidate list, the first neighboring sub-block having a column relationship to a block segment in the block segments; and/or insert a second indicator indicative of a second neighboring sub-block into the candidate list, the second neighboring sub-block having a row relationship to the block segment.

18. The apparatus of claim 16, wherein the processing circuitry is configured to:

determine whether a column length of the block is larger than a first length threshold;

determine whether a row length of the block is larger than a second length threshold; and/or determine whether an aspect ratio of the block is out of an aspect ratio range.

19. The apparatus of claim 16, wherein the processing circuitry is configured to divide the block in half to generate intermediate block segments; and divide the intermediate block segments in half in a recursive manner when the intermediate block segments meet the segment requirement.

20. A non-transitory computer-readable medium storing instructions which when executed by a computer for video decoding cause the computer to perform:

decoding prediction information for a block in a current coded picture that is a part of a coded video sequence, the prediction information being indicative of a merge submode;

constructing, in response to the merge submode, a candidate list of candidate motion vector predictors for the block, the candidate list including one or more first candidates from a first set of candidates that includes corner neighbors of the block and, when a size of the block meets a segment requirement, at least one second candidate from a second set of candidates that includes a side neighbor of the block, the first set of candidates not including the second set of candidates; and reconstructing the block according to motion information associated with one of the at least one second candidate.

* * * * *